Patented Aug. 30, 1932

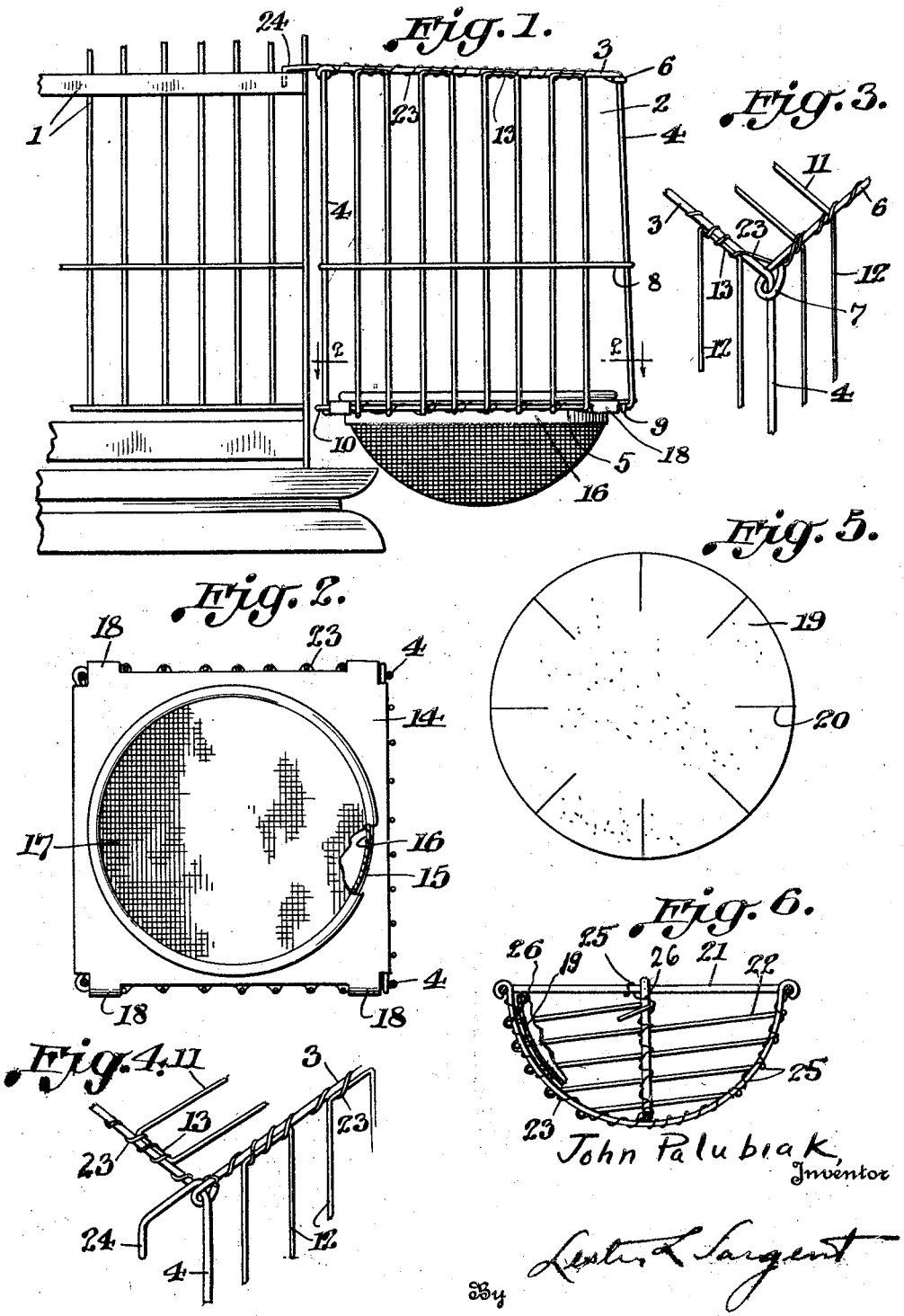

1,874,708

UNITED STATES PATENT OFFICE

JOHN PALUBIAK, OF ST. LOUIS, MISSOURI

OUTSIDE NEST FOR CANARY BIRD CAGES

Application filed September 26, 1930. Serial No. 484,677.

The object of my invention is to provide a novel, outside nest for canary bird cages of metal, which preferably has the nest portion detachable from the frame and which has many advantages over nests heretofore devised.

I attain the object of my invention by the device illustrated in the accompanying drawing, in which,—

Figure 1 is a side elevation of my nest applied to the canary bird cage;

Fig. 2 is a top plan view of the nest proper;

Fig. 3 is a detailed perspective view of an upper corner of the nest frame;

Fig. 4 is a detailed perspective view of the upper corner of the nest showing the hook 24;

Fig. 5 is a plan view of a blank from which the cardboard nest member is formed; and Fig. 6 is a section through a modified form of nest which may be made either detachable or integral with the main frame work of the nest.

Like numerals designate like parts in each of the several views.

Referring to the accompanying drawing, there is illustrated a portion of a main cage 1, to the outside of which at the door is my bird nest frame wire. The frame of the bird nest comprises horizontal lateral top wires 3, corresponding horizontal lateral bottom wires 5, with a transverse or end top wire 6 and transverse or end bottom wire 9, as shown in Figs. 1 and 3. Extending between the bottom and top wires of the frame are vertical corner wires 4 which are integral with the horizontal wires 3 and which horizontal wires 3 terminate in hook ends 24 adapted to fasten the bird nest framework to the bird cage 1, as shown in Fig. 1.

I provide spaced vertical wires 12 forming the sides and ends of the cage; those on the sides of the cage being looped at 13 and being tied to the main wires 3, 6, 5 and 9 by thin tie wires 23.

I provide a metal nest holding plate 14 of galvanized metal, this plate having corner flanges 18 which are looped around the bottom wires 5 to anchor the plate to the bottom of the bird nest framework. Plate 14 is provided with a circular opening 15 to receive the wire nest 17 which nest is provided with a metal rim 16, as shown in Fig. 2. I provide a card board disc 19, radially slitted as at 20 to removably seat in the nest 17.

I provide a horizontal bracing wire 8 which extends around the walls of the cage and is soldered to the wires 4 and 12. The framework of the cage is of approximately cubical shape.

Referring to Fig. 6, there is illustrated a modified form of wire nest comprising a ring 21 to which a pair of curved wires 26 are attached at right angles to each other; a spirally disposed wire encircling these wires 26 and being tied to them by suitable thin tie wires 25, as illustrated.

This form of nest may be made either detachable from the main framework; or if desired integral thereto. I prefer, however, to make the nest detached because of obvious advantages in removing and cleaning same.

The operation of the device will be obvious from the accompanying drawing. The nest framework is hooked by means of hooks 24 to the outside of the main bird cage 1 adjacent or in front of the door thereof, and the nest 17 being removable from the nest holding plate 14.

What I claim is:

1. In an outside nesting cage for attachment to canary bird cages, the combination of an approximately cubical wire frame, having relatively large corner wires and having smaller wires forming three sides and a top of the frame, said wires being tied to the corner wires by thin tie wires, hooks formed on the upper free ends of two of the corner wires for detachably securing the open side of the nest to the outside of a bird cage, a metal plate secured to the bottom of the wire frame, and a wire bird nest detachably mounted in the metal plate.

2. In an outside nesting cage for attachment to canary bird cages, the combination of an approximately cubical wire frame having relatively large corner wires and having smaller wires forming three sides and a top of the frame, said wires being tied to the corner wires by thin tie wires, a metal plate secured to the bottom of the wire frame, a wire bird nest detachably mounted in the metal plate, and a bracing wire soldered to the vertical wires and extending around and bracing the frame work of the cage.

3. In an outside nesting cage for attachment to canary bird cages, the combination of a wire frame having relatively large corner wires and having smaller wires forming three sides and a top of the frame, said wires being tied to the corner wires by thin tie wires, means for detachably securing the open side of the nest to the outside of a bird cage, a metal plate attached to the bottom of the wire frame and having a circular opening therein, and a wire bird nest seated in said opening and detachably mounted in the metal plate.

JOHN PALUBIAK.